Patented June 2, 1942

2,285,300

UNITED STATES PATENT OFFICE 2,285,300

CONCENTRATION OF CAUSTIC

Irving E. Muskat, Akron, Ohio, assignor to Pittsburgh Plate Glass Company, Allegheny County, Pa., a corporation of Pennsylvania No Drawing. Application March 25, 1940, Serial No. 325,789

3 Claims. (Cl. 23—302)

This invention relates to a method of concentrating an aqueous alkali metal hydroxide and is particularly related to the production of concentrated sodium hydroxide from an aqueous solution thereof. Sodium hydroxide as commercially prepared, is produced as a relatively dilute solution and in general, concentrated sodium hydroxide is prepared by evaporation of such solutions. The evaporation is conducted in metallic receptacles and in general, because of the corrosive nature of these solutions, it is found that the solutions are contaminated with metallic impurities during the evaporation to an objectionable degree.

Prior to the present invention, it has been known that concentrated sodium hydroxide could be secured by cooling a more dilute solution in order to crystallize out of solution a hydrate which is more concentrated as to sodium hydroxide and recovering the hydrate. This process ordinarily requires extensive cooling which is expensive. Moreover, solutions of sodium hydroxide are extremely viscous at temperatures at which the hydrate thereof normally crystallizes, and in consequence, crystals precipitating therefrom remain suspended therein and do not settle out of solution. Due to the high viscosity of such solutions, a recovery of crystals is extremely difficult and thus, the concentration of caustic by crystallization of hydrates thereof has not achieved success.

In United States Patent 1,961,590, granted to R. B. MacMullin, it is stated that sodium hydroxide monohydrate can be precipitated from aqueous solutions containing upwards of 20 percent of sodium hydroxide by treatment of the solution with ammonia. However, this patent points out that this process is objectionable because of the amount of ammonia required.

In accordance with my invention, I have found that by treatment of solutions containing at least 40 percent, preferably not less than about 50 percent sodium hydroxide, only small amounts of ammonia are required to cause precipitation of a solid hydrate and that it is possible to precipitate hydrated hydroxide which is substantially higher in concentration (generally containing in excess of 60 percent and often about 70 percent by weight of sodium hydroxide) than the solution undergoing treatment. By treating such solutions and recovering the solid hydroxide which is precipitated, concentrated sodium hydroxide may be recovered in a simple manner with only a small quantity of ammonia and without contamination of the caustic. By use of a larger quantity of ammonia, a product substantially higher in concentration containing 75 to 100 percent NaOH may be obtained.

The process may be regulated by controlling the temperature and the amount of ammonia present in the system. At a temperature of about 25° C., a small amount of ammonia added to a solution of sodium hydroxide containing 40 to 50 percent or more of NaOH causes precipitation of solid hydroxide which when separated from mother liquor possesses a concentration of 60 to 70 percent sodium hydroxide. By adding further amounts of ammonia, further quantities of caustic are precipitated and the caustic may be more concentrated. Upon treatment of such a solution at a higher temperature, for example, 35 to 60° C., or above, with ammonia, the mixture separates into two liquor layers, the lower of which contains a relatively high concentration of sodium hydroxide, a portion of water and a relatively small amount of ammonia, while the upper layer contains the major portion of the ammonia, a portion of the water, and a minor quantity of caustic. Upon addition of a still further quantity of ammonia, a solid hydroxide precipitates in the presence of the two liquid layers. When a further quantity of ammonia is added, the two separate liquid phases cease to exist and the solid hydroxide remains in equilibrium with a single liquid phase. This hydroxide when recovered contains 69 percent or often in excess of 85 to 90 percent of sodium hydroxide.

Thus, when about 0.1 to 1.1 parts of ammonia are mixed with one part of a 50 percent solution of sodium hydroxide in a suitable closed container at 60° C., two liquid phases are formed which separate in the container as an upper and lower layer. Upon adding more ammonia, however, the two liquid phases merge and solid caustic exists in equilibrium with a liquid phase containing ammonia, water and caustic. This solid is of substantially high concentration, generally having a concentration of at least 69 percent or above, and if sufficient ammonia is present the solid may be substantially anhydrous caustic.

In order to insure the production of a solid of higher concentration than that of the solution, it is desirable to maintain the temperature above that at which hydrates of the same or lower concentration precipitate. Thus, in treating a solution containing 70 percent NaOH, the temperature should be maintained above about 65° C. in order to prevent precipitation of monohydrate. Similarly, in treating 40 or 50 percent solutions, it is desirable to maintain the temperature above about 15 or 20° C. in order to prevent precipitation of dihydrate or the 3½ hydrate.

There is a marked difference between the amount of ammonia required to cause precipitation of solid hydroxide from a solution containing 50 percent or more of sodium hydroxide and that required to cause precipitation from a solution containing only 20 percent sodium hydroxide. The following table illustrates the differences in the amounts, at a temperature of 25 to 30° C.

| Conc. of NaOH solution | Grams of NH₃ per gram of solution to initiate crystallization | Grams of NH₃ per gram of NaOH in solution to initiate crystallization |
| --- | --- | --- |
| 16.7 per cent | 1.5 | 9.2 |
| 20.0 per cent | 1.3 | 6.6 |
| 30.0 per cent | 0.80 | 2.7 |
| 40.0 per cent | 0.33 | 0.84 |
| 50.4 per cent | 0.04 | 0.09 |

It will be noted that the amount of ammonia required is dependent upon the concentration of the solution and also upon the amount of hydroxide to be precipitated from solution and the temperature of the solution during crystallization. Generally speaking, in treating solutions containing 40 percent or more of sodium hydroxide, it is found desirable to precipitate up to 50 percent or more of the sodium hydroxide and for most purposes, up to about two or three parts of ammonia is used per part of sodium hydroxide in solution.

In accordance with a further modification, I have found that caustic may be effectively concentrated by first treating the caustic with sufficient ammonia to cause separation of two liquid phases and subsequently, cooling the mixture to a suitable temperature, for example, below 35° C. to cause the liquid phases to merge and formation of solid hydroxide of high concentration in equilibrium with a single liquid phase. This method is particularly desirable in treating 40 or 50 percent solutions since in treating solutions of such high concentration with ammonia, it is found that if a large amount of ammonia is added initially, caustic often precipitates in large lumps which when removed contain so much mother liquor that little or no concentration is secured. In accordance with the present method, it is possible to eliminate this difficulty.

The process may be conducted batchwise or continuously in any suitable type of closed apparatus. Suitable apparatus and methods of treatment have been described in my copending application 179,334, filed December 11, 1937. When substantial amounts of sodium chloride are present in the solution, a purified hydroxide is prepared by the present process. This method has been described and claimed in my copending application Serial No. 179,336, filed December 11, 1937. The present invention, however, is directed mainly to the concentration of sodium hydroxide in various solutions including solutions which may contain little or no sodium chloride.

The following examples are illustrative:

*Example I*—0.18 part by weight of anhydrous liquid ammonia was added to one part by weight of a solution containing 50 percent sodium hydroxide at a temperature of 30° C., whereupon solid hydroxide was precipitated. The mixture was agitated for one hour and filtered and dried under pressure. The crystals thus obtained contained about 68 percent of sodium hydroxide.

*Example II*—0.15 part by weight of anhydrous liquid ammonia was mixed with one part by weight of a solution containing 50 percent sodium hydroxide at a temperature of 45° C. The mixture was then cooled to 25° C. whereupon solid hydroxide precipitated and the two liquid phases merged. Upon recovery of the solid it was found to contain 68 percent NaOH.

*Example III*—One part by weight of anhydrous liquid ammonia was mixed with one part by weight of a solution containing 50 percent sodium hydroxide at a temperature of 70° C. The mixture was agitated to prevent separation of the two liquid phases thus formed into layers. Thereafter, 19 parts of additional ammonia was added and the two liquid phases merged leaving solid hydroxide and a single liquid phase. The solid hydroxide was recovered by filtration and was found to contain about 90 percent sodium hydroxide.

Although the process is particularly adapted to the use of anhydrous liquid ammonia mixtures of water and ammonia which contain sufficient ammonia (in general, about 65% NH₃) to cause precipitation of solid hydroxide may be used, if desired. While this process has been described for the most part with relation to sodium hydroxide and its hydrates, the process is equally applicable to the preparation of any of the hydrates of other alkali metal hydroxides, such as those of lithium or potassium hydroxide.

Although the present invention has been described in connection with the specific details of certain embodiments thereof, it is not intended that such details shall be regarded as limitations upon the scope of the invention, except insofar as included in the accompanying claims.

Some questions exists as to whether the solids precipitated in accordance with my invention are true hydrates, ammoniates or of other composition. By the term "hydrate" in the following claims, I means to include solids containing water and alkali metal hydroxide which precipitate from alkali metal hydroxide solutions upon addition of ammonia regardless of the exact composition of such solids.

I claim:

1. The method of preparing concentrated sodium hydroxide which comprises treating a solution containing not substantially less than 40 percent of sodium hydroxide with a substantial amount of ammonia in such concentration that a separation of liquid phases does not occur and maintaining the temperature such that a solid hydrate of concentration higher than that of the solution is precipitated.

2. The method of preparing concentrated alkali metal hydroxide which comprises treating a solution containing not substantially less than 40 percent of alkali metal hydroxide with a substantial amount of ammonia in such concentration that a separation of liquid phases does not occur and maintaining the temperature such that a solid hydroxide of concentration higher than that of the solution is precipitated.

3. A method of preparing concentrated sodium hydroxide which comprises treating a solution containing not substantially less than 50 percent of sodium hydroxide with a substantial amount of ammonia in such concentration that a separation of liquid phases does not occur and maintaining the temperature such that a solid hydroxide of concentration higher than that of the solution is precipitated.

IRVING E. MUSKAT.